Jan. 24, 1961

G. AGINS 2,968,956

GYRO COMPASS

Filed Nov. 14, 1947

INVENTOR:
GEORGE AGINS
BY
*Campbell Brumbaugh & Free*
HIS ATTORNEYS.

Jan. 24, 1961  G. AGINS  2,968,956
GYRO COMPASS

Filed Nov. 14, 1947  4 Sheets-Sheet 3

INVENTOR:
GEORGE AGINS
BY
Campbell, Brumbaugh & Free
HIS ATTORNEYS.

Jan. 24, 1961

G. AGINS 2,968,956

GYRO COMPASS

Filed Nov. 14, 1947

INVENTOR:
GEORGE AGINS

BY

Campbell, Brumbaugh & Free
HIS ATTORNEYS.

United States Patent Office 2,968,956
Patented Jan. 24, 1961

1

2,968,956
GYRO COMPASS

George Agins, Brooklyn, N.Y., assignor to American Bosch Arma Corporation, a corporation of New York Filed Nov. 14, 1947, Ser. No. 785,910

20 Claims. (Cl. 74—5.9)

This invention relates to gyroscopes, and has particular reference to compasses having gravity control providing and maintaining a stable horizontal reference axis in the north-south plane on a movable platform such as on motor vehicles, ships, airplanes and other craft subject to high acceleration forces.

In accordance with the present invention, the inner gimbal system of the horizontal axis gyroscope is supported on an axis lying in a normally vertical plane in a rotating frame supported on a horizontal axis driven by a motor so as to rotate continuously in one direction or to rotate in opposite directions in order to minimize the effect of friction and the like upon the two mutually perpendicular gyroscope axes with electromechanical means coordinated with the rotation of the gimbal system to rectify the effect of such rotation. The horizontal spin axis of the gyroscope of the compass of this invention is caused to assume a true north-south position in a horizontal plane by means of the action of gravity on pendulums controlling the operation of electrical torque devices for applying correcting torques about the gimbal axes of the gyroscope, together with corrective means provided to eliminate the effects of error-producing forces which may act upon the north-seeking element. The corrective means of this invention eliminate the effects of the following error-producing factors which act upon the gyroscope, i.e., the latitude error, due to vertical component of the earth's rotation; gyroscope error, due to gimbal bearing friction; flexes stiffness reactance error, due to flexible electrical connection between relatively moving parts; gimbal error, due to rotating gimbal unbalance; and, acceleration error, due to changes in speed and course of the mounting vehicle.

It will be seen that the gyroscopic system of this invention affords direction seeking and indication without requiring the gyroscope to be rendered pendulous or top-heavy with attendant errors, and that the correcting features provide great accuracy for operation in any and all latitudes without correction therefor except the usual change of latitude correction, thus producing a gyro-compass having universal application.

For a more complete understanding of the invention, reference may be had to the accompanying drawings, in which.

2

Figure 3:
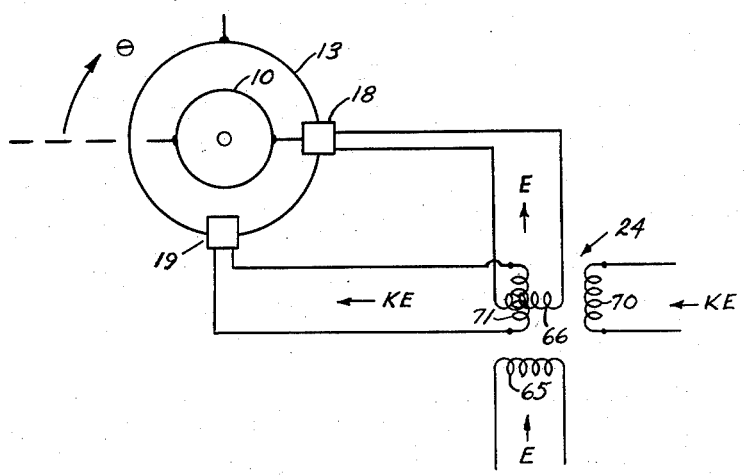
Fig. 3 is a schematic diagram of the inner rotating gimbal system in the zero rotational position, and illustrating the principle of this invention.
Figure 3A:
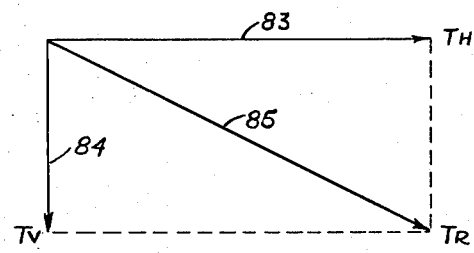
Fig. 3a is a vector diagram representing the magnitude and direction of the applied torque under the conditions depicted by Fig. 3.
Figure 5:
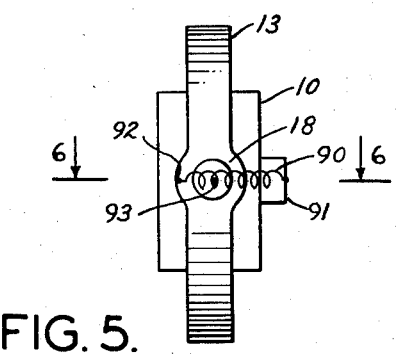
Figure 6:
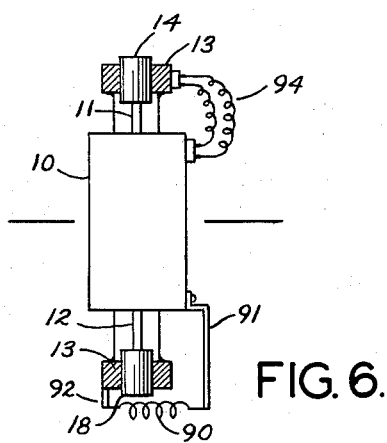
Figure 4:
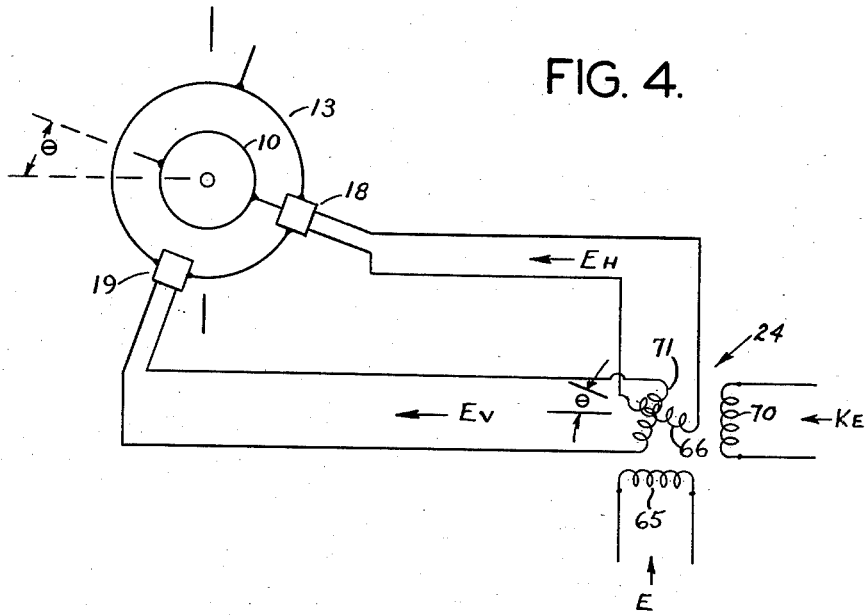
Fig. 4 is a schematic diagram of the inner rotating gimbal system in a rotational position displaced from that of Fig. 3, and further illustrating the principle of this invention.
Figure 4A:
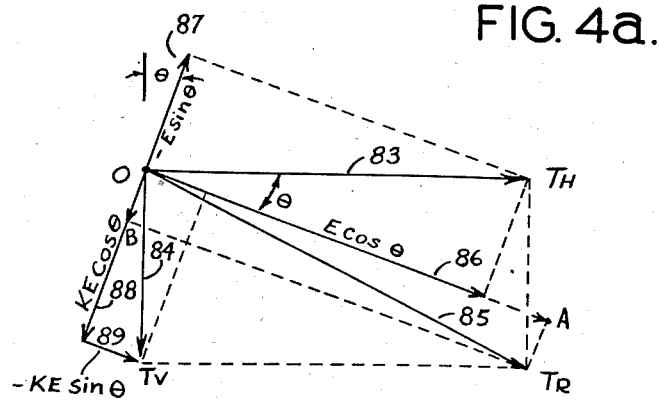

Fig. 4a is a torque vector diagram from Fig. 4, and is similar to that of Fig. 3a;

Fig. 5 illustrates an upsetting spring for neutralizing the flexes stiffness reactance of the inner rotating gimbal system; and Fig. 6 is a transverse section therethrough, as seen along the line 6—6 of Fig. 5.

Figure 1:
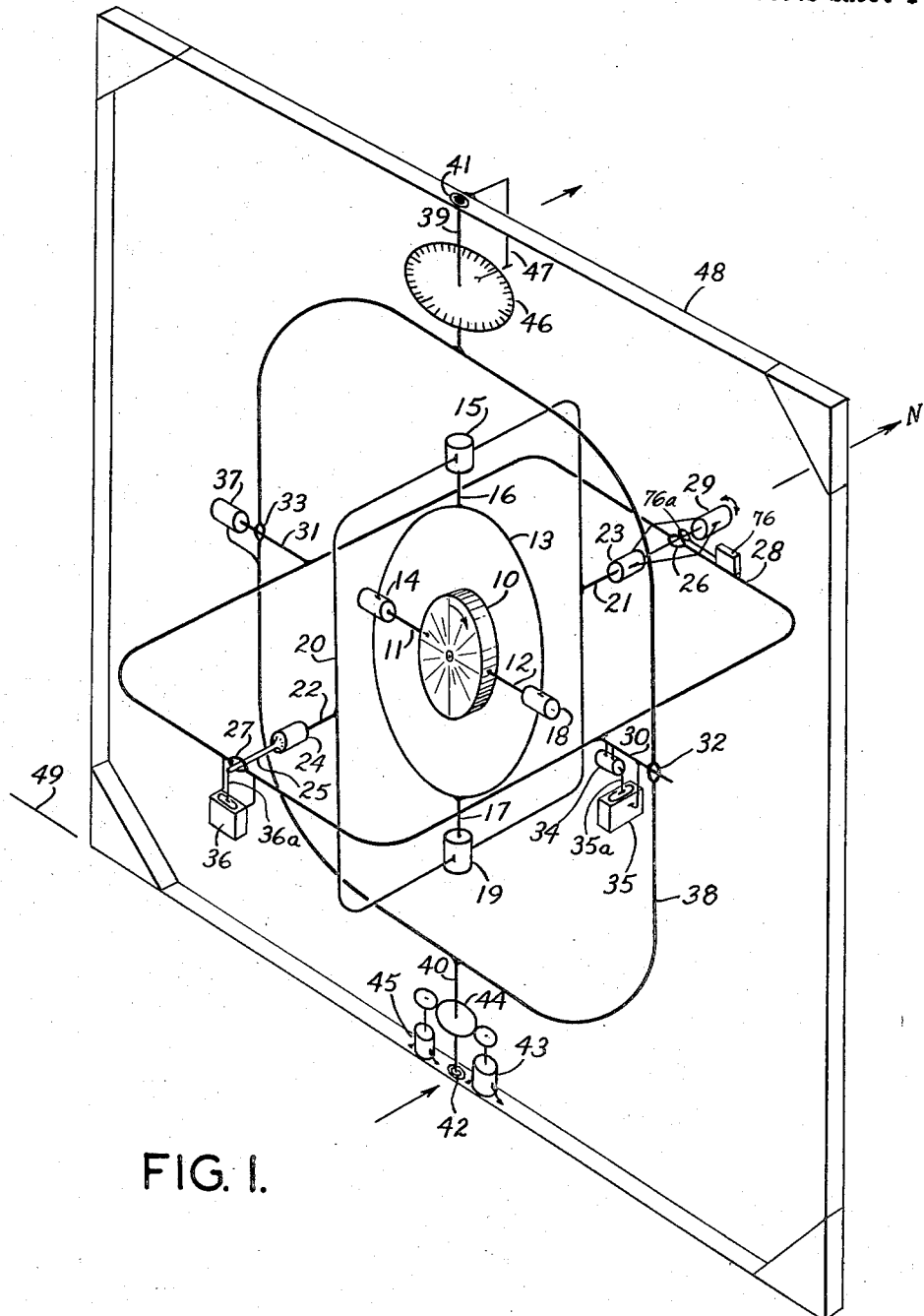
Figure 1 is a perspective schematic view of the gyroscopic system having direction-seeking properties and embodying the correction means of this invention.
Figure 2:
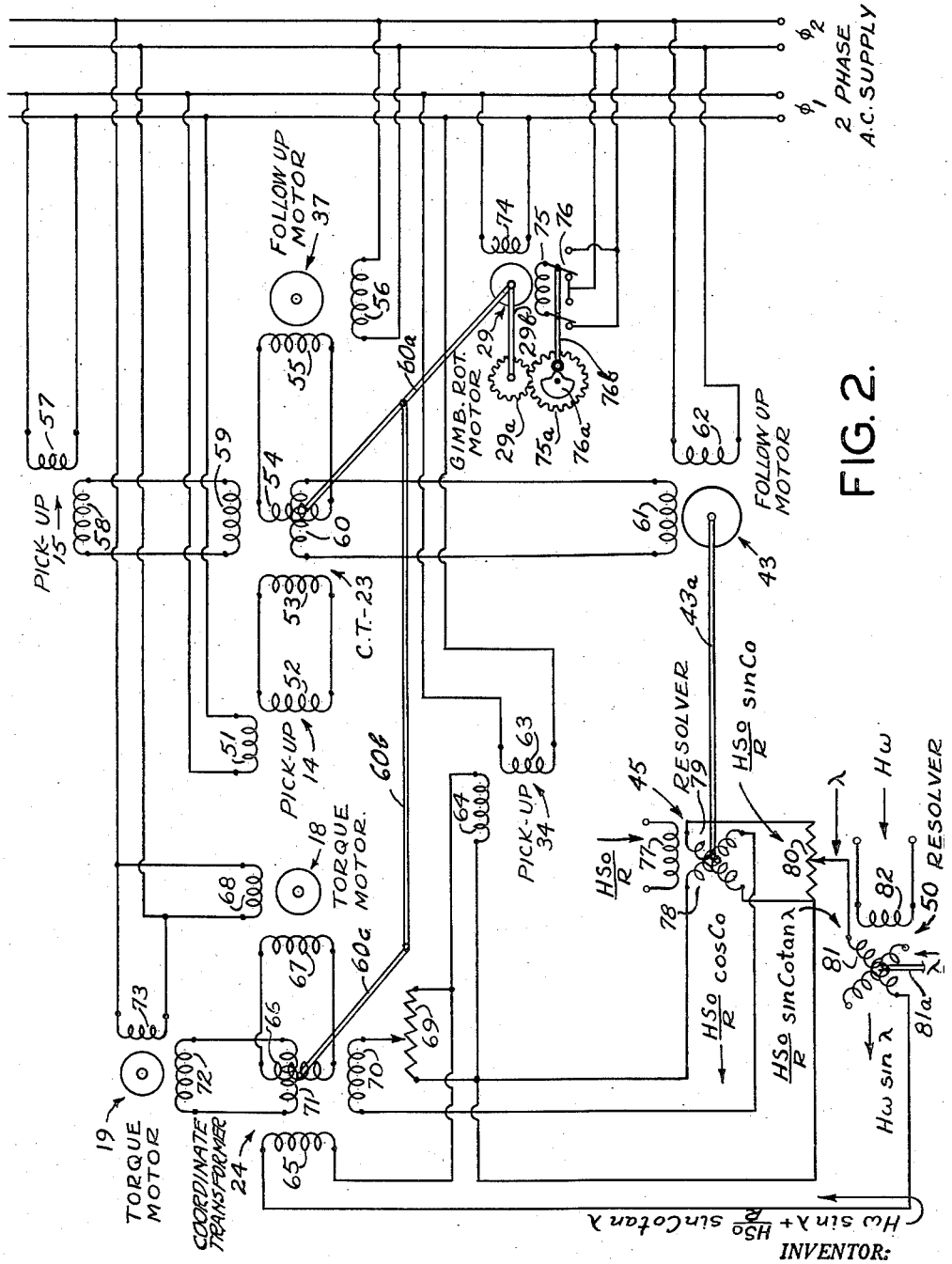
Fig. 2 is a schematic wiring diagram thereof.

In the description of the various positions and electro-inductive couplings of the gyroscope-correcting means of this invention, it is initially considered for the purpose of simplicity of description, that the entire system shown by Figs. 1 and 2 is in its energized operating condition and that all movable parts of the system are in the instantaneous positions wherein the movable platform is level with respect to the two mutually perpendicular horizontal axes, the horizontal spin axis of the gyroscope indicates the true north-south plane, the axes of the outer gimbal system are aligned with the axes of the inner rotating system, and the position of the rotating inner gimbal system is such that the mutually perpendicular axes of the rotating inner gimbal are aligned with the mutually perpendicular axes of the outer gimbal system.

Referring to Fig. 1, the gyroscope designated 10 may be of the type in which the spinning wheel is the rotor of a polyphase induction motor with the stator inside the gyroscope case and energized from a suitable polyphase alternating current supply, not shown. The gyroscope 10 is provided with three degrees of freedom, viz., the horizontal spin axis, the horizontal axis of the gyroscope, and the vertical axis of the inner gimbal ring 13, these axes being mutually perpendicular. The gyroscope 10 is in neutral equilibrium, being neither top-heavy nor pendulous, and its casing is supported by shafts 11 and 12 journalled respectively in the bearings of the electrical pick-up device 14 and the torque motor 18.

The stator frame of the electrical pick-up device 14 is carried by the inner vertical gimbal ring 13, and its rotor is mounted on an extension of the gyroscope supporting shaft 11 journalled in and engaging the combination thrust and ball bearing housed in the stator frame of the pick-up device 14.

Similarly, the stator frame of torque motor 18 is carried by the inner gimbal 13, and the rotor is mounted on an integral part of the gyroscope supporting shaft 12, journalled at its outer end of the torque motor 18 ball bearing. The pick-up rotor assemblies are made floating to gain the flexible shock-absorbing advantages of such a structure which is disclosed in detail in the copending application Serial No. 740,634, filed April 10, 1947, by Bishop and Mahland, to which reference may be had.

The supporting shafts 16 and 17 of the vertical inner gimbal ring 13 are journalled respectively in the rotor bearings of the electrical pick-up device 15 and torque motor 19. The stator frame of electrical pick-up device 15 is carried by the rotating vertical gimbal frame 20, and the shaft of its rotor is an extension of the supporting shaft 16 of ring 13. Similarly, the stator frame of torque motor 19 is carried by the rotating gimbal frame 20, and the shaft of its rotor is an extension of the supporting shaft 17.

It will be observed that the axis through the bearings of shafts 11 and 12, and the axis through the bearings of the shafts 16 and 17, are mutually perpendicular to the horizontal spin axis of the gyroscope 10, and these axes intersect at a point on the horizontal spin axis of the gyroscope, and that any relative movement of the gimbal ring 13 about the axis of shafts 11 and 12, displaces the rotor of the pick-up device 14 and the rotor of the torque motor 18 relatively to their respective stators. Also any relative movement of gimbal ring 13 about the axis of shafts 16 and 17, displaces the rotor of the pick-up device 15 and the rotor of the torque motor 19 relatively to their respective stators. In this way, the movements of the sensitive inner gimbal system comprising parts 10 to 19, inclusive, may be detected and controlled as is to be described.

In a similar way, the supporting shafts 21 and 22 of the gimbal rotation frame 20 are journalled at their outer ends respectively in the gimbal ring bearing 26 and the bearing of the rotor shaft of the coordinate transformer 24, this shaft being an extension of one supporting shaft 22 of the frame 20. Similarly, the shaft of the rotor of the coordinate transformer 23 is an extension of the other supporting shaft 21 of frame 20, as is the armature shaft of the gimbal rotation motor 29. The stator frames of the coordinate transformer 23 and of the gimbal rotation motor 29 are carried by the outer horizontal gimbal ring 28, within which the inner gimbar frame 20 rotates about a central horizontal axis through the bearings of the shafts 21 and 22, being driven by gimbal rotation motor 29.

The stator frame of the coordinate transformer 24 is supported in the outer horizontal frame 28 by the housing arbor 25 which extends through bearing 27 and which carries at its outer end a hanging weight, or pendulum 36a, arranged to swing only in a vertical plane at right angles to the horizontal axis through the gimbal rotation frame bearings 26 and 27. The pendulum 36a is damped as by being immersed in a container 36 carried by outer horizontal gimbal ring 28 and containing a suitable viscous fluid, such as oil, or by other means, to provide the required damping action to the motion of the pendulous weight.

The supporting shafts 30 and 31 of the outer horizontal gimbal ring 28 are journalled at the outer ends respectively in bearings 32 and 33 of the outer vertical follow-up frame 38. It will be observed that the horizontal axis through the bearings 26 and 27, and the horizontal axis through the bearings 32 and 33, are mutually perpendicular.

An electrical pick-up device 34 is supported by outer gimbal ring 28 by being secured to the supporting shaft 30, and the extension of its rotor shaft carries on its free end a hanging weight, or pendulum 35a, which is damped by being immersed in a container 35, also carried by shaft 30 and containing a suitable viscous fluid, such as oil, or by other means, to provide the required damping action of the motion of the pendulous weight. The pendulum 35a thus responds to the action of gravity as the gimbal ring 28 slowly tilts about the axis through the bearings 32 and 33, but will not respond to accelerations of short duration because of the damping means 35. Relative movement of the outer horizontal gimbal ring 28 about the axis through the bearings 32 and 33, produces angular displacement of the rotor of the electrical pick-up device 34 relatively to its stator, and motion of the pendulum 35a, which is free to swing only in a vertical plane at right angles to the horizontal axis through the bearings 32 and 33.

The shaft 31 of the outer gimbal ring extends through its bearing 33 in vertical frame 38 and carries the rotor of follow-up motor 37, secured to the frame 38, so that the operation of the follow-up motor 37 rotates the outer horizontal gimbal ring 28 within frame 38 about the horizontal axis through the bearings 32 and 33 on frame 38. Frame 38 is in turn supported by vertical shafts 39 and 40 journalled at their outer ends respectively in the bearings 41 and 42 of the compass frame or housing 48, which is mounted on and so aligned upon a platform 49 of a moving vehicle that the vertical plane of the compass frame 48 is perpendicular to the fore and aft center line of the vehicle, which may be a ship, for example.

Secured to the upper supporting shaft 39 of follow-up frame 38 is the indicating dial, or compass card 46, which provides visual indication of the relative position of the horizontal spin axis of the gyroscope 10 with respect to the compass frame lubber line 47, or provides indication of the course of the vehicle 49 carrying the compass frame or housing 48. This lubber line may be a fixed index 47 secured to the compass frame 48 as shown in Fig. 1. The lower supporting shaft 40 of vertical follow-up frame 38 carries the follow-up drive gear 44 driven by the armature of the follow-up motor 43 mounted on the compass frame or housing 48, so that the operation of the follow-up motor 43 rotates the outer vertical follow-up frame 38 about the vertical axis through the bearings 41 and 42. If desired, a self-synchronous transmitter or step transmitter, of conventional construction but not shown, can be secured to the compass frame 48 and connected to gear 44, so that its rotor is mechanically driven by the follow-up motor 43 for giving remote compass indications. Also mounted on compass frame or housing 48 with its rotor geared to gear 44 is an electrical resolver 45, so that the operation of the follow-up motor 43 rotates the rotor of the electrical resolver 45.

Resolver 45, as well as pick-up devices 14, 15 and 34, and coordinate transformers 23 and 24 consist essentially of a laminated rotor having two independent windings in space quadrature rotating in the field of a laminated stator having two independent windings in space quadrature, as indicated in Fig. 2. One or both stator or rotor windings may be used.

Thus, the electrical resolver 45 uses one primary winding or input winding 77 and two secondary windings 78 and 79, and its zero position is selected so that the output voltage of one secondary winding, 78, is directly proportional to the cosine function of the displacement angle, and the output voltage of the other secondary winding, 79, is directly proportional to the sine function of the displacement angle and is the input to potentiometer 80. The rotor of resolver 45 comprising the windings 78 and 79, is driven by the armature of azimuth follow-up motor 43 by shaft 43a.

Resolver 50 is similar and utilizes one input primary winding 82 and one output secondary winding 81 in series with potentiometer 80, and its zero position is selected so that its output voltage is directly proportional to the sine function of its rotor displacement angle provided by a shaft 81a driven by a source to be described.

In the electrical pick-up devices 14, 15 and 34, single stator and rotor windings are used, and the zero position is selected with the rotor winding in space quadrature with the stator winding, so that when the primary winding is energized by an alternating current voltage, the voltage induced in the secondary winding is directly proportional to the sine function of the displacement angle, and zero voltage output is obtained at zero displacement angle, i.e., (sin 0°=0). In view of the very small displacement angles involved in normal operating conditions, the output voltages of the secondary windings of the electrical pick-up devices 14, 15 and 34 are substantially proportional to their respective displacement angles.

In the coordinate transformers 23 and 24, two primary windings and two secondary windings are used, and the zero position of the coordinate transformers is selected with the two space quadrature windings on the rotor in alignment with the two space quadrature windings on the stator, so that when only one of the two primary windings is energized by an alternating current voltage, the output voltage of one secondary winding is directly proportional to the sine function of the displacement angle $\theta$, and the output voltage of the other secondary is directly proportional to the cosine function of the displacement angle $\theta$. When both primary windings are energized by alternating current voltages which are in time phase relation to each other, the resultant magnetic flux produced by these two primary windings causes voltages to be induced in both secondary windings. The voltage induced in either secondary winding is equal to the sum of the voltages induced in it by each of the primary windings. Considering that voltage A is applied to one primary winding, and that voltage B is applied to the other primary winding, then the voltage in one secondary is proportional to $$A \sin \theta + B \cos \theta$$

and the voltage induced in the other secondary winding is proportional to $$A \cos \theta - B \sin \theta$$

where $\theta$ is the displacement angle of the coordinate transformer 23 or 24.

The torque motors 18 and 19, the gimbal rotation motor 29, and the follow-up motors 37 and 43 are of the two phase, two winding, reversible, induction type. A fixed voltage from one phase of the two phase supply is applied to the main field winding of the motor, a variable voltage from the other phase of the two phase supply is applied to the control field winding of the motor, and the torque developed by the motor is directly proportional to the magnitude of the voltage applied to the control field winding. The direction of rotation or the direction of the torque developed by the motor is reversed by changing the phase sequence of the two phase voltages applied to the motor.

As shown in Fig. 2, the primary winding 51 of electrical pick-up device 14 is electrically connected to phase one ($\phi_1$) of the two phase alternating current supply, while the secondary winding 52 of the pick-up device 14 is electrically connected to primary winding 53 of coordinate transformer 23. The secondary winding 54 of coordinate transformer 23 is electrically connected to the control winding 55 of the follow-up motor 37, while the main field winding 56 of the follow-up motor 37 is electrically connected to phase two ($\phi_2$) of the two phase alternating current supply.

The primary winding 57 of electrical pick-up device 15 is electrically connected to $\phi_1$, while the secondary winding 58 of the pick-up device 15 is electrically connected to the primary winding 59 of the coordinate transformer 23. The secondary winding 60 of coordinate transformer 23 is electrically connected to the control winding 61 of the follow-up motor 43, while the main field winding 62 of the follow-up motor 43 is electrically connected to $\phi_2$. The rotor of coordinate transformer 23 is connected by shaft 60a to the armature of gimbal rotation motor 29, for rotation thereby.

The primary winding 63 of electrical pick-up device 34 is electrically connected to $\phi_1$, while the secondary winding 64 of the pick-up device is connected to the primary winding 65 of the coordinate transformer 24. The correction voltage produced by the respective secondary windings 79 and 81 of resolvers 45 and 50 and by the potentiometer 80, is applied to the primary winding 65 of the coordinate transformer 24 connected in series with the secondary winding 64 of the pick-up device 34. The secondary winding 66 of coordinate transformer 24 is connected to the control winding 67 of the torque motor 18, while the main field winding 68 of the torque motor 18 is electrically connected to $\phi_2$ of the two phase alternating current supply.

The secondary winding 64 of the electrical pick-up device 34 is also electrically connected across the tapped resistor of voltage divider or potentiometer 69, while the tapped portion of the resistor 69 is electrically connected to the primary winding 70 of coordinate transformer 24. The correction voltage produced by the electrical resolver 45 is applied to the primary winding 70 of the coordinate transformer 24, in series with output portion of the potentiometer 69. The secondary winding 71 of the coordinate transformer 24 is electrically connected to the control winding 72 of the torque motor 19, while the main field winding 73 of the torque motor 19 is electrically connected to $\phi_2$ of the two phase supply. The rotor of coordinate transformer 24 is driven by gimbal rotation motor 29 by shafting 60a, 60b, and 60c.

The main field winding 74 of the gimbal rotation motor 29 is electrically connected to $\phi_1$, while the control field winding 75 of motor 29 is energized from $\phi_2$. Reversing switch 76 is interposed in the electrical circuit between $\phi_2$, and the control field winding 75 of the gimbal rotation motor 29, and is connected by link 76b to the follower of cam 76a driven by gearing 75a, 29a and shaft 29b from gimbal rotation motor 29. When the reversing switch 76 is actuated by cam 76a the electrical connection of $\phi_2$ to the control field winding 75 is automatically reversed, thereby changing the phase sequence of the two-phase voltages applied to the motor 29.

In operation of the system illustrated in Figs. 1 and 2 as a gyro compass and assuming initially that the wheel of the gyroscope 10 is spinning with its spin axis displaced from the meridian, or not in alignment with the north-south plane, the earth's rotation and the rigidity of plane property of a spinning wheel causes the spin axis of the gyroscope 10 to tilt out of the horizontal plane. This tilting displaces the rotor of the electrical pick-up 14 from its zero position due to the relative movement of the gyroscope 10 with respect to the inner gimbal ring 13, thus resulting in induction by the primary winding 51 of a voltage in the secondary winding 52. This output voltage from the secondary winding 52 energizes the primary winding 53 of the coordinate transformer 23, resulting in the induction of a voltage in the secondary winding 54 of the coordinate transformer 23. Energization of the control winding 55 of the follow-up motor 37 results and the follow-up motor 37 drives the outer horizontal gimbal ring 28 and the inner gimbal rotation frame 20, about the axis through the bearings 32 and 33 through the angle and in the direction which restores the rotor of the pick-up device 14 to its zero position, so that the output voltage of the pick-up device 14 becomes zero.

Inasmuch as the one gimbal ring 28 has been driven through the angle of tilt assumed by the spin axis of gyroscope 10, the plane of this gimbal ring is in alignment with the tilted position of the spin axis of the gyroscope 10. This movement of the outer gimbal ring 28 from its level or horizontal position about the axis through the bearings 32 and 33, into the plane of the tilted spin axis of the gyroscope 10, and the action of gravity on the pendulum 35a, is accompanied by the angular displacement of the rotor of the electrical pick-up device 34 from its zero position, so that its primary winding 63 induces a voltage in the secondary winding 64. Energization of the primary winding 65 of the coordinate transformer 24 results in causing induction of a voltage in the secondary winding 66, which energizes the control winding 67 of the torque motor 18 to apply a torque to the supporting shaft 12 about the axis of the shafts 11 and 12. The direction of rotation of the spinning wheel of the gyroscope 10, and the direction of the torque applied by torque motor 18 about the axis of the shaft 11 and 12, is such as to result in the precession of the gyroscope 10 about the axis of shafts 16 and 17, so that the spin axis of the gyroscope 10 moves toward the meridian or approaches the north-south plane.

The previously described displacement of the rotor of the pick-up device 34 from its zero position also results in simultaneous application of a torque about axes 16, 17 of inner gimbal ring 13. This action is initiated by the application of the output voltage of pick-up device 34 across the tapped resistor 69, so that a fixed portion or percentage of this voltage energizes the primary winding 70 of the coordinate transformer 24. The resulting voltage induced in the secondary winding 71 of the coordinate transformer 24, energizes the control winding 72 of the torque motor 19, so that it applies a torque to inner gimbal ring 13, as described. The direction of rotation of the spinning wheel of gyroscope 10, and the direction of this torque is such as to result in precession of the gyroscope 10 about the axis of shafts 11 and 12, so that the spin axis of the gyroscope 10 moves toward the horizontal or approaches the true horizontal plane. Hence, the aligned position of the plane of the outer horizontal frame 28 in agreement with the tilted position of the spin axis of the gyroscope 10, and the action of gravity on the pendulum 35a, which angularly displaces the rotor of the pick-up device 34 from its zero position, results in the operation of the torque motors 18 and 19.

The operation of the torque motor 18 results in the precession of the gyroscope 10 about the vertical axis through shafts 16 and 17, as previously described, and the precession displaces the rotor of electrical pick-up device 15 from its zero position, and its primary winding 57 induces a voltage in the secondary winding 58. This voltage is applied to the primary winding 59 of coordinate transformer 23, and results in the induction of a voltage in the secondary winding 60, which energizes the control winding 61 of the follow-up motor 43. The operation of the follow-up motor 43 drives the vertical follow-up frame 38, about the axis through the bearings 41 and 42, in the direction and through an angle such that the rotor of pick-up device 15 is restored to its zero position, where the output voltage of the pick-up device 15 becomes zero.

Since the pick-up device 15 no longer produces a voltage, the primary winding 59 of coordinate transformer 23 is deenergized and with it the control winding 61 of follow-up motor 43, which had driven the outer vertical follow-up frame 38, about the axis through bearings 41 and 42, so that the vertical plane through the bearings 26 and 27 is in alignment with the position of the spin axis of the gyroscope 10. Hence the purpose of electrical pick-up device 14 and its cooperating follow-up motor 37, and electrical pick-up device 15 and its cooperating follow-up motor 43, is to keep the axis through the bearings 26 and 27 of the outer horizontal gimbal ring 28 aligned at all times with the spin axis of gyroscope 10. The operation of the torque motors 18 and 19 continues to control the precession of the sensitive element, i.e. the gyroscope 10 and inner gimbal ring 13, as previously described, until the pick-up device 34 has been restored to its zero position.

It is a well known gyroscopic phenomenon, that the horizontal torque applied by the correction applying torque motor 18, if acting alone, would result in continuous undamped oscillations of the spin axis of the gyroscope 10 across the meridian, and the amplitude of these oscillations would be equal to the initial angular displacement of the spin axis of the gyroscope from the meridian. In order to reduce the amplitude of each subsequent oscillation of the sensitive element, a vertical torque is applied by the damping torque motor 19, so as to diminish the tilting of the spin axis of the gyroscope 10, caused by the earth's rotation.

By means of the tapped resistor 69, the output voltage of the gravity simulating pick-up 34, utilized to energize the control winding of damping torque motor 19, is reduced so that the torque developed by the damping torque motor 19 is about 30% of the torque that is developed by the correction applying torque motor 18. This relationship between the torques applied by the two torque motors 18 and 19 is required in order that the sensitive element will effectively settle on the meridian and exhibit stability. The torque applied by the correction applying torque motor 18 about the horizontal axis through the shafts 11 and 12, and the torque applied by the damping torque motor 19 about the vertical axis through the shafts 16 and 17, in conjunction with the earth's rotation and rigidity of plane property of the spinning wheel of the gyroscope 10, cause the spin axis of the gyroscope 10 to settle on a horizontal axis in the north-south plane, or on the meridian.

The alignment of the outer horizontal gimbal ring 28 with the settled horizontal position of the spin axis of gyroscope 10, and the action of gravity on correction pendulum 35a, restores the position of the rotor of the gravity simulating pick-up device 34 to its zero position, and reduces the output voltage thereof to zero. The control winding 67 of the correction applying torque motor 18, and the control winding 72 of the damping torque motor 19 are accordingly deenergized, thereby removing the torques which were applied respectively to the inner gimbal ring 13 about horizontal axis 11, 12, and about the vertical axis 16, 17. Hence the precession of the spin axis of the gyroscope 10 about the vertical axis 16, 17, and about the horizontal axis 11, 12 ceases, and the spin axis of the gyroscope is settled on the meridian, thus indicating the true north.

Any deviation of the spin axis of the gyroscope 10 from the true north, results in a tilt of the spin axis of the gyroscope, which thereby displaces the rotors of the electrical pick-up devices 14 and 15 from their zero positions. The resulting output voltages of the pick-up devices 14 and 15, causes the operation of follow-up motors 37 and 43, respectively, to bring the outer gimbal ring 28 in alignment with the displaced axis of the gyroscope 10. The action of gravity on the correction pendulum 35a, displaces the rotor of the gravity simulating pick-up device 34, and the resulting output voltage energizes the control fields of the respective correction torque 18 and damping torque motors 19. The torques applied thereby to the gyroscope 10 causes the axis of the gyroscope to precess in such a fashion that it will again settle on the meridian and indicate true north. The aligned position of the outer horizontal gimbal ring 28 with the spin axis of the gyroscope 10, and the action of gravity on the correction pendulum 35a, restores the position of the rotor of the pick-up device 34 to its zero position, thereby reducing the output voltage of this pick-up device to zero. Hence the control windings of the torque motors 18 and 19 become deenergized, and the torques which were applied by these motors are removed, thereby the precession of the gyroscope 10 ceases with its axis indicating the true north.

As was previously stated, the stabilizing follow-up motor 37 and the azimuth follow-up motor 43, keep the axis through the bearings 26 and 27 in exact alignment with the spin axis of the gyroscope 10, so that compass card 46 secured to the supporting shaft 39, indicates with reference to fixed index 47, the angular relation of the spin axis of the gyroscope 10 with the vertical plane of the compass frame 48. Inasmuch as the compass frame 48 is secured to the platform 49 of the moving vehicle, and the spin axis of the gyroscope 10 indicates the true north, the index 47 indicates on compass card 46 the course of the vehicle, such as a ship. In view of the rigidity of plane property of the spinning gyroscope 10, a change in course of the vehicle displaces the rotor of the electrical pick-up device 15 from its zero position, and, as previously stated, the resulting output voltage operates the azimuth follow-up motor 43, which drives outer vertical follow-up frame 38 about the axis of the bearings 41 and 42, so as to restore the position of the rotor of the pick-up device 15 to its zero position. At the same time, index 47 indicates on the compass card 46 the changing course of the vehicle.

The rotation of the earth and the motion of the vehicle on the surface of the earth, will produce apparent deviation of the spin axis of the gyroscope from the meridian. The inherent property of the gyroscope to remain fixed in space while the earth rotates and the vehicle moves, will appear to the observer as resulting in the precession of the gyroscope, and corrective torques must be applied to the gyroscope to compensate for these error producing factors. One such error is the latitude error which is the apparent precession of the gyroscope about the vertical axis, producing deviation of the spin axis from the meridian, due to the convergence of the lines of longitude and earth's rotation, i.e., an error due to the vertical component of earth's rotation. Hence for a northern latitude, a compensating torque must be applied to the gyroscope about the horizontal axis by torque motor 18, through shafts 11 and 12, in order to produce precession of the north end of the axis of the gyroscope from east to west about the vertical axis 16, 17, and the rate of this westerly precession of the gyroscope must be such that the spin axis of the gyroscope maintains the indication of the north-south plane.

The movement of the vehicle eastward or westward, adds or subtracts to the motion produced by the earth, hence increases or decreases the speed that the gyroscope is carried in space, thus producing the error known as the east-steaming error which has an effect on the gyroscope similar to the change in latitude. Because of the similarity, the east-steaming error may be corrected by application of an additional torque about the horizontal axis 11, 12 of the gyrocompass. Thus, the torque required to compensate for the latitude error is proportional to, $$H\omega \sin \lambda$$

and the torque required to compensate for the east-steaming error is proportional to $$\frac{HSo}{R} \sin Co \tan \lambda$$

where
$H$=angular momentum of the gyroscope wheel
$\omega$=angular velocity of earth's rotation
$R$=radius of the earth
$\lambda$=latitude
$So$=speed of the vehicle (own speed)
$Co$=course of the vehicle (own course)

In addition, a corrective torque is applied to the gyroscope about the vertical axis 16, 17 by the torque motor 19 to correct for the north-steaming error, which is the error due to the velocity of the vehicle northward and comparable to a rotation about an east-west axis through the center of the earth. The combination of the motion of the ship northward and the earth's rotation, produces a resultant motion of the ship in space about an axis which is deviated from the true north-south axis of the earth, causing the compass to settle and indicate the apparent instead of the true meridian. The tendency for this error is manifested by a continuation of an upward tilt of the north end of the gyroscope axis as the vehicle moves northward, due to the curvature of the earth and rigidity of plane property of the gyroscope. Hence correction for the north-steaming error is a tilt rate correction, and the correction torque is applied about the vertical axis 16, 17, as described, in order to provide the compensating precession about the horizontal axis, and is proportional to $$\frac{HSo}{R} \cos Co$$

The three corrective torques thus required to compensate for the latitude, east-steaming and the north-steaming errors are obtained by application of voltage proportional to $$\frac{HSo}{R}$$

derived from $\phi_1$ and applied to the primary winding 77 of the electrical resolver 45, whose secondary winding rotor is driven by the course or azimuth follow-up motor 43, so that angular displacement of the secondary windings 78 and 79 with respect to the primary winding 77, is thereby a function of the course of the vehicle, $Co$. Hence, the output voltage of the secondary winding 78 is proportional to $$\frac{HSo}{R} \cos Co$$

which is the north-steaming compensating voltage, and is applied in series with the primary winding 70 of coordinate transformer 24, thereby inducing a voltage of the secondary winding 71 which is applied to the control winding 72 of the torque motor 19. The operation of the torque motor 19 produces a torque about the vertical axis 16, 17 and results in the precession of the gyroscope about the horizontal axis 11, 12, thereby producing a correction in the tilt rate of the axis of the gyroscope to compensate for the north-steaming error.

Similarly, the output voltage of the secondary winding 79 of resolver 45 is proportional to $$\frac{HSo}{R} \sin Co$$

and is applied across the potentiometer 80 whose variable contactor is governed by a tangent cam not shown, but displaced through angle $\lambda$ by a suitable mechanical input of $\lambda$, such as that connected to shaft 81a. The output voltage of the potentiometer accordingly is proportional to $$\frac{HSo}{R} \sin Co \tan \lambda$$

which is the east-steaming compensating voltage and this is applied in series with secondary winding 81 of the electrical resolver 50, as shown. The other primary winding 82 is supplied with a voltage proportional to $H\omega$ derived from $\phi_1$ and the rotor winding 81 is displaced through angle $\lambda$ by the mechanical input of $\lambda$ applied to shaft 81a, so that the resulting output voltage of resolver 50 is proportional to $H\omega \sin \lambda$, which is the latitude compensating voltage.

Inasmuch as the output of the potentiometer 80 is connected in series with the secondary winding 81 of the resolver 50, the resultant output voltage is proportional to $$H\omega \sin \lambda + \frac{HSo}{R} \sin Co \tan \lambda$$

and is applied in series with the primary winding 65 of the coordinate transformer 24. The resulting voltage induced in the secondary winding 66 is applied to the control winding 67 of the torque motor 18, causing operation of the torque motor 18 to produce a torque about the horizontal axis 11, 12, and results in the precession of the gyroscope about the vertical axis 16, 17 at a rate to compensate for the apparent precession caused by the latitude error and the east-steaming error.

The effect of the rolling motion of a ship sailing an intercardinal course, produces the well known intercardinal rolling error of the gyroscopic compass which is known to be caused by the overswinging of the sensitive element of the gyroscopic compass at the extreme positions of the roll motion, and the resultant torques produced by the effect of this overswing, produces deviation of the sensitive element when the vessel is sailing an intercardinal course. In the gyroscopic compass of this invention, the intercardinal error is so minimized that it is practically eliminated, by damping the pendulum 35a to a high degree. This is effected by placing a fluid of high viscosity in container 35, so that the pendulum time constant is equal to several minutes and hence exceeds the rolling period of the vessel. Accordingly, the pendulum will not be affected by this motion, so that overswing is eliminated, and, at the same time, the pendulum time constant of several minutes will be too short in comparison to the natural period of the sensitive element of the compass to restrict its normal operation. The damping of the pendulum 35a, in conjunction with the operation of follow-up motor 37, maintains the plane of the outer gimbal ring 28 in alignment with the spin axis of the gyroscope 10, and prevents the overswinging of the sensitive element and gimbal ring about the horizontal axis through the bearings 32 and 33.

Additional to the provisions for correcting the errors described, the entire inner gimbal system of the sensitive element of this invention, i.e. vertical frame 20, inner gimbal ring 13, and gyroscope 10, are rotated continuously in alternate directions about the horizontal axis 26, 27, by means of the reversible gimbal rotation motor 29 and its cooperating reversing switch 76, for the purpose of eliminating (a) the precession of the gyroscope which is caused by the friction in the bearings of the inner gimbal system, (b) the precession of the gyroscope due to the flexes stiffness reactance of connecting electrical wires, in conjunction with an upsetting spring, and (c) the precession of the gyroscope due to centrifugal force of rotating inner gimbal 13 when it is tilted out of the vertical plane. It is not essential that the inner rotating gimbal system be periodically reversed in order to obtain the corrections of (b) and (c), above, as these corrections can also be obtained by continuous rotation of inner gimbal system in one direction only.

The spin axis of a horizontal spin axis gyroscope supported in a rotating gimbal system tends to align itself, by the shortest path, with the axis about which the gimbal system is rotating, and not with the true horizontal, because of the friction in the gimbal bearings. The periodic reversing of the direction of rotation of the rotating gimbal system, cancels the effect of friction about the two mutually perpendicular gyroscope axes perpendicular to the axis of gimbal rotation, i.e. axes 11, 12 and 16, 17, and effectively eliminates the precession of the gyroscope caused by the friction in the gimbal bearings of the rotating gimbal system. The operation of reversing switch 76 may be obtained by the conventional gearing and cam arrangement 29a, 75a, 76a and 76b, as shown, whereby the inner gimbal system 13, 20, is rotated by motor 29 from an initial starting position, such as that shown by Fig. 1, through a generated angle in one direction of rotation to a predetermined position, at which point the reversing switch 76 is mechanically operated by cam 76a, which results in reversal of the connection to the control field winding 75 of the gimbal rotation motor 29, thereby changing the phase sequence of the two-phase supply to the motor 29 and reversing the direction of rotation of the same. This results in return drive of the inner gimbal system back through the generated angle to the initial starting position, at which point the reversing switch 76 is again operated, and the above-described reversing procedure for the direction of rotation of the inner gimbal system is continued as long as the system is in operation.

At this point it is necessary to again consider coordinate transformers 23 and 24, since their function is to provide continuous inductive coupling between the cooperating electrical pick-up devices and motors of the inner rotating gimbal system and the outer gimbal system, for all rotational positions of the rotating inner gimbal system, so that the magnitude and direction of the resultant torque of the torques applied by the torque motors 18 and 19, and the magnitude and direction of the resultant torque of the torques applied by the two follow-up motors 37 and 43, remain fixed in space while the inner gimbal system is rotating. In other words, the coordinate transformers 23 and 24 produce an "unscrambling" effect to rectify the result of the gimbal rotation, and this effect is illustrated in Figs. 3, 3a, 4 and 4a, Figs. 3 and 3a illustrating the operation of coordinate transformer 24 for the zero rotational position of the inner rotating gimbal system, where $\theta=0$, as in Figs. 1 and 2, and Figs. 4 and 4a, illustrating the operation of the coordinate transformer 24 for a rotational position where the inner rotating gimbal system is displaced through angle $\theta$ from its zero position.

In considering those diagrams, it is assumed that the maximum ratio of voltage transformation between a primary winding and a secondary winding of coordinate transformer 24 is unity, but it is understood that the maximum ratio of voltage transformation above referred to could be of values other than unity. For example, when the spin axis of the gyroscope of Fig. 1 is displaced from the meridian, the output voltage E of the gravity simulating pick-up device 34 is applied to the primary winding 65 of coordinate transformer 24, and a portion of the output voltage, KE, of the pick-up device 34 is applied to the primary winding 70 of the coordinate transformer 24, as indicated in Figs. 2 and 3. In view of the fundamental operation of the coordinate transformer described and the assumed maximum inductive between the primary and secondary windings of the coordinate transformer, it follows that the voltage induced in the secondary winding 66 of the coordinate transformer 24, by the voltages applied to the primary windings 65 and 70, is, $$E_H = E \cos \theta + KE \sin \theta$$

and the voltage induced in the secondary winding 71 of the coordinate transformer 24 by the voltages applied to the primary windings 65 and 70, is, $$E_V = KE \cos \theta - E \sin \theta$$

Inasmuch as $\theta=0$ in Fig. 3 for the zero rotational position of the inner rotating gimbal system as shown in Figs. 1 and 2, the resultant voltage induced in secondary winding 66 of the coordinate transformer 24 is E and the resultant voltage induced in secondary winding 71 is $K_E$, whereas the output voltage E from the secondary winding 66 energizes the control winding 67 of torque motor 18, and the horizontal torque, $T_H$, applied to gimbal ring 13 about the axis of shafts 11 and 12, by the torque motor 18, is indicated by torque vector 83 of Fig. 3a. The output voltage KE from the secondary winding 71 energizes the control winding 72 of the torque motor 19, and the vertical torque, $T_V$, applied to the gimbal ring 13 about the axis of shafts 16 and 17, by the torque motor 19, is indicated by the torque vector 84 of Fig. 3a, whose other torque vector 85 indicates the resultant torque, $T_R$, produced in space relation by the torque motors 18 and 19.

On the other hand, when $\theta=\theta$, as shown in Fig. 4, the inner rotating gimbal system is in the position where it is displaced from its zero rotational position through the angle $\theta$, so that the resultant voltages induced in the secondary winding 66 is $E_H = E \cos \theta + KE \sin \theta$, and in secondary winding 71 is $E_V = -E \sin \theta + KE \cos \theta$, which are respectively applied to control windings of the torque motors 18 and 19. The component of the voltage $E \cos \theta$ applied to torque motor 18, produces in magnitude and direction a torque indicated by vector 86 of Fig. 4a, and the component of the voltage $-E \sin \theta$ applied to torque motor 19, produces in magnitude and direction a torque indicated by vector 87. Composing the torque vectors 86 and 87 of Fig. 4a produces the resultant horizontal torque $T_H$ indicated by vector 83, which will be seen to have the same magnitude and direction as the torque vector 83 in Fig. 3a. The component of the voltage $-KE \sin \theta$ applied to torque motor 18, produces in magnitude and direction a torque indicated by vector 89 in Fig. 4a, and the component of the voltage $KE \cos \theta$ applied to torque motor 19, produces in magnitude and direction a torque indicated by vector 88. Composing the torque vectors 88 and 89 produces the resultant vertical torque $T_V$ indicated by vector 84, which is of the same magnitude and direction as the torque vector 84 in Fig. 3. Finally, the torque vector 85 of Fig. 4a indicates in magnitude and direction the resultant torque $T_R$ produced in space relation by the torque motors 18 and 19, which is of the same magnitude and direction as the torque vector 85 in Fig. 3a.

Still referring to Fig. 4a, the resolution of the torques produced by torque motors 18 and 19 can be manifested in a different fashion. Thus, the voltage $$E_H = E \cos \theta + Ke \sin \theta,$$

applied to the torque motor 18, produces in magnitude and direction a torque indicated by torque vector OA, which is composed of vectors 86 and 89. The voltage $E_V = -E \sin \theta + KE \cos \theta$, applied to the motor 19, produces in magnitude and direction a torque indicated by torque vector OB, which is composed of the vectors 87 and 88. Composing the torque vectors OA and OB, produces the resultant torque TR indicated by the torque vector 85. The resultant torque vector 85 can be resolved into a horizontal torque TH, and a vertical torque $T_V$, indicated by the torque vectors 83 and 84, respectively, and the magnitude and the direction of the horizontal and vertical torques applied to the gimbal ring 13, is the same as in Fig. 3. It is thus seen that the magnitude and direction of the resultant horizontal and vertical torques of the torque motors 18 and 19 remain fixed in space for all rotaational positions of the rotating inner gimbal system.

On its part, the coordinate transformer 23 "unscrambles" the voltages which are applied to the control windings of the follow-up motors 37 and 43 by the pick-up devices 14 and 15 in the same manner as just described for coordinate transformer 24. Thus, as shown in Fig. 1, where the inner gimbal system is in its zero rotational position, or $\theta = 0°$, the torque motor 18 is the correction applying torque motor operating about the horizontal axis, and the torque motor 19 is the damping torque motor operating about the vertical axis. When $\theta = 90°$, the inner gimbal system is displaced 90° from its zero rotational position, and the function of the torque motors 18 and 19 are interchanged, so that torque motor 18 becomes the damping torque motor operating about the vertical axis, and the torque motor 19 becomes the correction applying motor. When $\theta = \theta$ as shown in Figs. 4 and 4a, inner rotating gimbal system is in the position where it is displaced from its zero rotational position through the angle $\theta$, the functions of the torque motors 18 and 19 are complementary, so that each operates partially as a correction and applying torque motor and partially as a damping torque motor. In order that the function of these torque motors are interchanged exactly at each 90° rotational position of the inner gimbal system, commencing at the zero rotational position as shown in Fig. 1, and in order that the resultant horizontal and resultant vertical torques applied by these torque motors are accurate in direction and magnitude about the horizontal and vertical, for all rotational positions of the inner gimbal system, the zero position of the coordinate transformer 24 must be in exact alignment with the zero position of the inner rotating gimbal system.

Tilting of the platform 49 about an axis perpendicular to the plane of frame 48 produces a corresponding tilt of the outer horizontal gimbal ring 28 about an axis through the bearings 26 and 27. In these circumstances, if the frame of the coordinate transformer were secured to the gimbal ring 28, the frame of the coordinate transformer 24, being supported by gimbal ring 28, would be rotated about the horizontal axis through an agle equal to the tilt of the platform 49, with the result of false "unscrambling" by the coordinate transformer 24 of the voltages which are applied to the torque motors 18 and 19, so that resultant torques produced by the torque motors would not be applied to gyroscope 10 about the true horizontal and true vertical axis. In order to maintain the true relative zero position of the coordinate transformer 24 with respect to the true horizontal and true vertical axes, the frame of the coordinate transformer 24 is supported by the housing arbor 25 shown in Fig. 1 as extending through the bearing 27 in gimbal ring 28. The housing arbor 25 is secured to a pendulum 36a, and the action of gravity on this pendulous weight, rotates the frame of the coordinate transformer 24 to compensate for the angle of tilt of the platform 49 in the vertical plane through the axis of the shafts 30 and 31.

The slight restraint imposed upon the freedom of relative movement by the flexible electrical connections that are required to conduct electricity to and from the gyroscope and the various electrical units of the compass between relatively moving mechanical parts where contact rings are not practicable, nevertheless introduces error and is known as flexes stiffness reactance. The spring effect produced by the flexes between relatively moving mechanical parts, can result in undesirable precession of the gyroscope and this stiffness reactance imposed on the inner rotating gimbal system is neutralized by the use of preloaded upsetting springs, one such spring being applied about the horizontal axis through the shafts 11 and 12, and another such spring being applied about the vertical axis through the shafts 16 and 17, and shown in Figs. 5 and 6. The spin axis of the gyroscope 10 is shown perpendicular to the plane of rotation of the inner gimbal ring 13 and an upsetting spring 90 is secured at one end to a bracket 91 extending from the case of the gyroscope 10, while the other end of this spring is secured to the inner rotating gimbal ring 13, so that the point of attachment 92 is to the left of the center of shaft 12, indicated at 93. The horizontal axis of the upsetting spring 90 intersects the rotational axis of shafts 11 and 12, at point 93, so that as long as the condition shown in Figs. 5 and 6 exists, no torque is produced by spring 90 about the shaft 12. However, as soon as relative movement occurs between inner gimbal ring 13 and the shaft 12, the upsetting spring 90 is displaced from its neutral or zero torque-producing position, and applies a torque to the inner gimbal ring 13 about the shaft 12, in opposition to the torque produced by the stiffness reactance of flexes 94. The preloading of the upsetting spring, such as 90, is of the magnitude to effectively counteract the flexes stiffness reactance of the entire inner rotating gimbal system, and the preloading is independent of the speed of rotation of the inner rotating gimbal system.

Although a preferred embodiment of the invention is illustrated and described herein, the invention is not limited thereby, but is susceptible of changes in form and detail within the scope of the appended claims.

I claim:

1. A gyroscopic system adapted to be mounted on an unstable support, the combination of a horizontal axis gyroscope suspended in an inner gimbal mounting, an outer gimbal mounting suspending said inner gimbal mounting on said support, motive means rotating said inner gimbal mounting about a horizontal axis, and reversing mechanism driven by said motive means for periodically reversing the direction of rotation of said inner gimbal mounting.

2. A gyroscopic system adapted to be mounted on an unstable support, the combination of a horizontal axis gyroscope suspended in an inner gimbal mounting, an outer gimbal mounting suspending said inner gimbal mounting on said support, electrical motive means rotating said inner gimbal mounting about a horizontal axis, a source of electric power connected to said motive means, and a reversing switch interposed between said motive means and said power source for periodically reversing the direction of rotation of said inner gimbal mounting.

3. A gyroscopic system adapted to be mounted on an unstable support, the combination of a horizontal axis gyroscope suspended in an inner gimbal mounting, an outer gimbal mounting suspending said inner gimbal mounting on said support, motive means rotating said inner gimbal mounting about a horizontal axis, reversing mechanism interposed between said motive means and said inner gimbal mounting for periodically reversing the direction of rotation of said inner gimbal mounting, and timing mechanism interposed between said reversing mechanism and said motive means for predetermining equal angular rotative movements of said inner gimbal mounting at either side of a fixed datum line.

4. A gyroscopic system adapted to be mounted on an unstable support, the combination of a horizontal axis gyroscope suspended in an inner gimbal mounting, an outer gimbal mounting suspending said inner gimbal mounting on said support, electrical motive means rotating said inner gimbal mounting about a horizontal axis, a two-phase power source, a main field winding for said motive means energized from one phase of said power source, a control field winding for said motive means energized from the other phase of said power source, a switch interposed between said other phase and said control field winding for reversing the connections to the latter, and reversing mechanism connected to said switch and driven by said motive means for periodically reversing the direction of rotation of said inner gimbal mounting.

5. A gyroscopic system adapted to be mounted on an unstable support, the combination of a horizontal axis gyroscope suspended in an inner gimbal system, an outer gimbal mounting supporting said inner gimbal system about a horizontal axis, and motive means operatively connected to said inner gimbal system for rotating said inner gimbal system about said last-named horizontal axis.

6. A gyroscopic system adapted to be mounted on an unstable support, the combination of a horizontal axis gyroscope suspended in an inner gimbal system, an outer gimbal mounting supporting said inner gimbal system about a horizontal axis, motive means operatively connected to said inner gimbal system for rotating the same about said last-named horizontal axis, and means driven by said motive means for periodically reversing the direction of rotation of said inner gimbal system.

7. A gyroscopic system adapted to be mounted on an unstable support, the combination of a horizontal axis gyroscope suspended in an inner gimbal system, an outer gimbal mounting supporting said inner gimbal system about a horizontal axis, motive means operatively connected to said inner gimbal system for rotating the same about said last-named horizontal axis, a transformer having a rotor winding rotated with said inner gimbal system and having a stator winding, electrical means responsive to deviation of said gyroscope from a predetermined plane for developing a voltage proportional to the magnitude of said deviation, additional connections between said electrical means and the stator winding of said transformer, means mounting said outer gimbal mounting on said support for rotation about a vertical axis, a follow-up motor operatively connected to said outer gimbal mounting for rotating the same about its vertical axis, and electrical connections between the rotor winding of said transformer and said follow-up motor means for energizing the same.

8. A gyroscopic system adapted to be mounted on an unstable support, the combination of a horizontal axis gyroscope suspended in an inner gimbal system for movement about an axis, an outer gimbal mounting supporting said inner gimbal system about a horizontal axis, motive means operatively connected to said inner gimbal system rotating the same about said last-named horizontal axis, electrical means responsive to relative movement about said second-named axis for developing a voltage proportional to the magnitude of such movement, a follow-up motor operatively connected to said outer gimbal mounting, a transformer having a rotor winding rotated with said inner gimbal system and having a stator winding, electrical connections between said electrical means and said stator winding for energizing the same, and electrical connections between the rotor winding of said transformer and said follow-up motor for energizing the same.

9. A gyroscopic system adapted to be mounted on an unstable support, the combination of a horizontal axis gyroscope suspended in an inner gimbal system for movement about an axis, an outer gimbal mounting supporting said inner gimbal system about a horizontal axis, a frame supporting said outer gimbal mounting about a vertical axis, motive means operatively connected to said inner gimbal system for rotating the same about said last-named horizontal axis, electrical means responsive to relative movement about said second-named axis for developing a voltage proportional to the magnitude of such movement, a follow-up motor operatively connected to said frame, a transformer having a rotor winding rotated with said inner gimbal system and having a stator winding, electrical connections between said electrical means and said stator winding for energizing the same, and electrical connections between the rotor winding of said transformer and said follow-up motor for energizing the same.

10. A gyroscopic system including a horizontal axis gyroscope suspended in a gimbal mounting on an unstable support, the combination of means for rotating said mounting about a substantially horizontal axis, electrical means for exerting a torque about at least one of the gimbal axes of said mounting and having a winding, a transformer having a rotor winding rotated with said gimbal mounting and having a stator winding, means for energizing said stator winding and electrical connections between the rotor winding of said transformer and the winding of said torque exerting means, whereby said means exerts a torque about said gimbal axis.

11. A gyroscopic system including a horizontal axis gyroscope suspended in a gimbal mounting on an unstable support, the combination of means for rotating said mounting about a substantially horizontal axis, electrical means for exerting a torque about the coordinate gimbal axes of said mounting and each having a winding, a transformer having a rotor winding rotated with said gimbal mounting and having a stator winding, means for energizing said stator winding, and electrical connections between the rotor winding of said transformer and the windings of said torque exerting means, whereby said means exert corresponding torques about said coordinate gimbal axes.

12. A gyroscopic system including a horizontal axis gyroscope suspended in a gimbal mounting on an unstable support, the combination of means for rotating said mounting about a substantially horizontal axis, electrical means for exerting a torque about at least one of the gimbal axes of said mounting and having a winding, a transformer having a rotor winding rotated with said gimbal mounting and having a stator winding, means for energizing said stator winding, a pendulum connected to said transformer for adjusting the angular relation between the stator and rotor windings of said transformer to adjust the induced voltage in accordance with said relative movement, and electrical connections between the rotor winding of said transformer and the winding of said torque exerting means, whereby said means exerts a torque about said gimbal axis.

13. A gyroscopic system including a horizontal axis gyroscope suspended in a gimbal mounting on an unstable support, the combination of means for rotating said mounting about a substantially horizontal axis, electrical means for exerting a torque about the coordinate gimbal axes of said mounting and each having a winding, a transformer having a rotor winding rotated with said gimbal mounting and having a stator winding, means for energizing said stator winding, a pendulum connected to said transformer for adjusting the angular relation between the stator and rotor windings of said transformer to adjust the induced voltage in accordance with said relative movement, and electrical connections between the rotor winding of said transformer and the winding of each of said torque exerting means, whereby said means exerts a torque about said coordinate gimbal axes.

14. A gyroscopic system including a horizontal axis gyroscope suspended in a gimbal mounting on an unstable support, the combination of means for rotating said mounting about a substantially horizontal axis, electrical means for exerting a torque about at least one of the gimbal axes of said mounting and having a winding, a transformer having a rotor winding rotated with said gimbal mounting and having a stator winding, a pendulum connected to said transformer adjusting the angular relation between the stator and rotor windings of said transformer to adjust the induced voltage in accordance with said relative movement, means for damping the movements of said pendulum, and electrical connections between the rotor winding of said transformer and the winding of said torque exerting means, whereby said means exerts a torque about said gimbal axis.

15. A gyroscopic system adapted to be mounted on an unstable support, the combination of a horizontal axis gyroscope suspended in an inner gimbal system, an outer gimbal mounting supporting said inner gimbal system about a horizontal axis, a frame supporting said outer gimbal mounting about a horizontal axis, means mounting said frame on said support for rotation about a vertical axis, a follow-up motor for rotating said frame about said last-named vertical axis, means responsive to relative movement of said gyroscope about a vertical axis for developing a voltage proportional to the magnitude of said movement, and electrical connections between said responsive means and said follow-up motor for driving said frame about said first-named vertical axis.

16. A gyroscopic system adapted to be mounted on an unstable support, the combination of a horizontal axis gyroscope suspended in an inner gimbal system about an axis, an outer gimbal mounting supporting said inner gimbal system about a horizontal axis, a frame supporting said outer gimbal mounting about a vertical axis, a follow-up motor for rotating said frame about said last-named vertical axis, means responsive to relative movement about said second-named axis for developing a voltage proportional to the magnitude of said movement, electrical connections between said responsive means and said follow-up motor for driving said frame about its vertical axis, a torque motor for exerting a torque about one of said gimbal axes, a transformer having a rotor winding driven by said follow-up motor and a stator winding energized at least in part by a voltage proportional to latitude, and electrical connections between the rotor winding of said transformer and said torque motor for energizing the latter.

17. A gyroscopic system adapted to be mounted on an unstable support, the combination of a horizontal axis gyroscope suspended in an inner gimbal system about an axis, an outer gimbal mounting supporting said inner gimbal system about a horizontal axis, a frame supporting said outer gimbal mounting about a vertical axis, a follow-up motor for rotating said frame about said last-named vertical axis, means responsive to relative movement about said second-named axis for developing a voltage proportional to the magnitude of said movement, electrical connections between said responsive means and said follow-up motor for driving said frame about its vertical axis, a torque motor for exerting a torque about one of said gimbal axes, a transformer having a rotor winding driven by said follow-up motor and a stator winding energized at least in part by a voltage proportional to the speed of said support, and electrical connections between the rotor winding of said transformer and said torque motor for energizing the latter.

18. A gyroscopic system adapted to be mounted on an unstable support, the combination of a horizontal axis gyroscope suspended in an inner gimbal system about an axis, an outer gimbal mounting supporting said inner gimbal system about a horizontal axis, a frame supporting said outer gimbal mounting about a vertical axis, a follow-up motor for rotating said frame about said last-named vertical axis, means responsive to relative movement of said frame about said last-named vertical axis for developing a voltage proportional to the magnitude of said movement, a torque motor for exerting a torque about said second-named axis, electrical connections between said responsive means and said torque motor for energizing the same, and means interposed in said last-named connections for modifying the torque exerted by said torque motor.

19. A gyroscopic system adapted to be mounted on an unstable support, the combination of a horizontal axis gyroscope suspended in an inner gimbal system about an axis, an outer gimbal mounting supporting said inner gimbal system about a horizontal axis, a frame supporting said outer gimbal mounting about a vertical axis, a follow-up motor for rotating said frame about said last-named vertical axis, means responsive to relative movement of said frame about said last-named vertical axis for developing a voltage proportional to the magnitude of said movement, a torque motor for exerting a torque about said second-named axis, electrical connections between said responsive means and said torque motor for energizing the same, a transformer having a rotor driven by said follow-up motor and connected in said connections in series with said responsive means and torque motor, and means interposed in said last-named connections for modifying the torque exerted by said torque motor.

20. A directional gyroscopic system adapted to be mounted on an unstable support, the combination of an electrically driven gyroscope, an inner gimbal suspension for said gyroscope having relatively movable journal parts, an outer gimbal mounting supporting said inner gimbal system about a horizontal axis, flexible electrical conductors extending between at least two of said relatively movable parts and affording some resistance to free relative movement between said last-named parts, a preloaded upsetting spring extending between said last-named parts across the corresponding journal between them and in the vertical plane of said journal for neutralizing said resistance, and means for rotating said outer gimbal mounting about said horizontal mounting axis, whereby substantially complete freedom of friction between said last-named parts is afforded.

References Cited in the file of this patent

UNITED STATES PATENTS

| | | |
|---|---|---|
| 1,136,566 | Usener | Apr. 20, 1915 |
| 1,386,029 | Rossiter | Aug. 2, 1921 |
| 1,749,059 | Bassett | Mar. 4, 1930 |
| 2,008,058 | Boykow | July 16, 1935 |
| 2,048,834 | Young | July 28, 1936 |
| 2,293,039 | Esval | Aug. 18, 1942 |
| 2,383,409 | Newell | Aug. 21, 1945 |
| 2,417,081 | Lynn | Mar. 11, 1947 |